United States Patent Office

3,366,593
Patented Jan. 30, 1968

3,366,593
POLYMERS FROM POLYMERIC SILAZANE MONOMERS AND AROMATIC ORGANIC DIOLS
Laurence W. Breed, Overland Park, Kans., and Richard L. Elliott, Kansas City, Mo., assignors, by mesne assignments, to the United States of America as represented by the Secretary of the Army
No Drawing. Filed Apr. 2, 1964, Ser. No. 356,955
10 Claims. (Cl. 260—33.6)

ABSTRACT OF THE DISCLOSURE

A viscous or solid stable silazane polymer resin is obtained in accordance with this disclosure by reacting an organosilazane, preferably one having the general formula $(RR'SiNR'')_3$ wherein R, R' and R'' are monovalent alkyl (e.g., methyl) or aryl groups with a carbocyclic diol wherein the hydroxyl groups are separated by at least three carbon atoms of the carbocyclic ring, such as bisphenol "A" or resorcinol. The preferred resin consists essentially of repeating units having the general formula

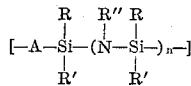

wherein:

$n$ is an integer from 1 to 3 inclusive (preferably 2);
R, R', and R'' are monovalent alkyl or aryl groups (not necessarily the same); and
A is a divalent radical of a carbocyclic diol whose two —O— groups are separated by at least three carbon atoms of the carbocyclic ring, each such —O— group being directly linked to a silicon atom. Examples of A are p,p'-isopropylidene bisphenoxy (from bisphenol "A") and benzene-1,3-dioxy (from resorcinol).

This invention generally relates to silazane polymers and more particularly relates to organosilazane-aromatic diol polymers produced by reacting dimeric, trimeric, or tetrameric cyclic or linear silazane monomers with carbocyclic compounds containing at least two hydroxyl groups.

As is disclosed in a number of the patents to Nicholas D. Cheronis, such as U.S. Patent No. 2,579,418 dated Dec. 18, 1951, silazanes may be prepared by reacting the organohalogenosilanes with ammonia or a primary amine. This type of silazane taught by Cheronis was further modified by the Boyer et al. U.S. Patent No. 3,043,798 dated July 10, 1962. Boyer produced improved resins by reacting the silazanes with a dihydroxy-organic compound to displace the silicon-nitrogen linkages with silicon-oxygen linkages.

Desirable physical properties are obtained in materials compounded from polymers when the polymers consist of high molecular weight linear chains. As set forth above, attempts were made to improve the characteristics of polymers containing silicon-nitrogen linkages through the ammonolysis of multifunctional organosilanes or mixtures of multifunctional organosilanes. The resins were also subjected to reaction with organic diols to eliminate the silicon-nitrogen linkages and replace them with a silicon-oxygen linkage.

It is known that the value of silazane polymers is limited in practical applications by two factors characteristic of compounds containing silicon-nitrogen linkages. (C. Eaborn, Organosilicon Compounds, Academic Press, New York, 1960). One characteristic is the ease of hydrolysis of silicon-nitrogen bonds; the other is the tendency of silazanes to form small ring compounds. The hydrolytic instability can lead to degradation of a resin containing silicon-nitrogen linkages when the resin is exposed to atmospheric moisture. The tendency of compounds containing silicon-nitrogen bonds to form ring compounds limits the molecular weight of the products when difunctional organosilicon derivatives are treated with ammonia, and products are either oils or crystalline materials. Efforts to increase the molecular weight through the use of tri and tetrafunctional organosilicon compounds results in brittleness.

The ammonolysis of compounds of the type $R_2SiCl_2$ yields only small ring compounds for example, dichlorodimethylsilane and ammonia produce only hexamethylcyclotrisilazane and octamethylcyclotetrasilazane. The aminolysis of compounds of the type $R_2SiCl_2$ produces chiefly compounds of the structure $R_2Si(NHR)_2$ when primary amines are employed. However, if the primary amine is methylamine, a dimer with the structure $$CH_3N[Si(CH_3)_2NHCH_3]_2$$

can also be isolated as a product, but more highly condensed compounds or polymers are not obtained.

Therefore it is an object of the present invention to provide a linear polymer having recurring silazane and carbocyclic groups.

It is another object of the present invention to provide an organosilazane-aromatic diol polymer having recurring silazane and carbocyclic groups.

It is still further another object of the present invention to provide a composition consisting of organosilazane-aromatic diol polymers produced by reacting a carbocyclic compound having at least two hydroxyl groups with silazanes produced from a diorganodihalosilane.

It is still another object of the present invention to provide silazane polymers having linked alternating silazanes and carbocyclic groups.

It is still a further object of the present invention to provide a polymer containing aromatic and linear silazane groups.

It is further an object of the present invention to provide a linear organosilazane-aromatic diol polymer having alternating linear silazanes and carbocyclic groups linked by an oxygen, by reacting a carbocyclic diol with silazanes produced from a difunctional organochlorosilane.

It is another object of the invention to provide polymers that contain silazane linkages, but have improved hydrolytic stability.

Still another object of the invention is to provide soluble polymers that contain silazane linkages and have high molecular weights.

Other objects, features, and advantages of the present invention will become more apparent from the following description, examples and appended claims.

The silazanes used to provide the organosilazane-aromatic diol polymers of the present invention are preferably those compounds on which two organic groups are substituted on each silicon atom. Suitable silazanes that are obtained directly by the ammonolysis or aminolysis or diorganodihalosilane having the formula

include the silazanes having the following general structures:

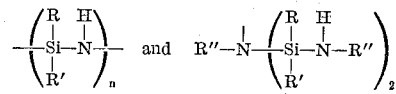

Hal represents halogen and is preferably chlorine, n is 2, 3, or 4, R and R' are alike or different and are selected from substituted or unsubstituted aliphatic or aromatic groups of which the following are illustrative: (alkly)-methyl, ethyl, lauryl, isopropyl, tertiary butyl, cyclopropyl, cyclohexyl, and substituted alkyl groups, such as 2-chloroethyl; (aryl)-phenyl, alpha or beta-naphthyl and substituted aryl groups, such as para-chlorophenyl; (aralkyl)-phenethyl; and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, for example, dimethylamino diethylamino, methylphenylamino. Preferably, R and R' are monovalent alkyl or aryl groups; as such groups have been found, at least at the present time, to have the best stability, especially with respect to hydrolysis.

R" is an organic group acquired from a primary amine if the initial reaction involved aminolysis, illustrative amines being alkyl amines, such as methylamine and ethylamine; allylamine; ethylenediamine; hexamethylenediamine; aryl amines, for example, aniline and para-phenylenediamine and alkaryl amines like benzylamine.

Silazanes of the above type that have been satisfactorily employed in the present invention are hexamethylcyclotrisilazane, octamethylcyclotrisilazane, bis(methylamino) pentamethyldisilazane, 2,4,6,-trimethyl- 2,4,6-triphenyl-cyclotrisilazane, and 2,2,4,4,6,6,-hexaphenylcyclotrisilazane.

The cyclotrisilazanes that are useful in the present invention that cannot be satisfactorily prepared by reacting the diorganodichlorosilane with ammonia or an amine are prepared by several different methods. For example, a process for preparing 1,3,5-tris(trimethylsilyl)hexamethylcyclotrisilazane by metallating hexamethylcyclotrisilazane with butyllithium and treating the intermediate with chlorotrimethylsilane is known. It is possible that the metallated intermediate can also be treated with an alkyl halide to obtain the corresponding trisubstituted cyclotrisilazane. Nonamethylcyclotrisilazane is reported to be the product of the dilithium derivative of MeN (SiMe$_2$NHME)$_2$ and dichlorodimethylsilane.

It has been found that cyclic trimers can be more conveniently prepared by the thermal decomposition of diorganodiaminosilanes in the presence of an acid catalyst. The monomers are usually heated at 160–210° C., and amine is allowed to distill out of the reaction flask. One weight per cent ammonium sulfate can satisfactorily be used as the catalyst. This method is particularly suited to the preparation of nonamethylcyclotrisilazane, which can be prepared in high yield in this manner.

A linear trisilazane can be prepared by treating the product of the reaction of dichlorodimethylsilane and ethylenediamine with methylamine to give a material with the structure,

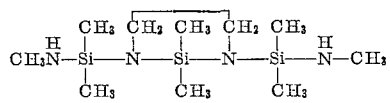

Classes of silazane compounds that cannot be prepared by the amonolysis or aminolysis of dichlorodiorganosilanes include as the most important group the N-substituted cyclotrisilazanes which have the structure,

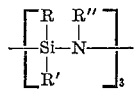

where R, R', and R" are alike or different and are selected from various substituted or unsubstituted aliphatic or aromatic organic groups. Also members of this class of compounds are those in which the R" groups are at least partly triorganosilyl groups, the remainder of the R" groups being hydrogen.

Silazanes of this type that have been successfully employed in the polymerization reactions include nonamethylcyclotrisilazanes, hexamethyl-1,3,5-triphenylcyclotrisilazane, hexamethyl-2,4,6-triphenylcyclotrisilazane, hexaphenyl-1,3,5-trimethylcyclotrisilazane, 1,3-bis(methylaminodimethylsilyl) - 2,2 - dimethyl - 1,3 - diaza - 2-silacyclopentane, N-trimethylsilylhexamethylcyclotrisilazane, and 1,3-bis(trimethylsilyl)hexamethylcyclotrisilazane.

When the above silazanes, that are not obtained by the direct aminolysis or ammonolysis of diorganodichlorosilanes, are treated with the carbocyclic diols polymers are obtained which incorporate silicon-nitrogen bonds and have improved hydrolytic stability.

Because of the importance of stoichiometry in the polymerization reaction, the preferable results are obtained when purified silazanes are employed in the reaction with carbocyclic diols.

The organosilazane-aromatic diol polymers of the present invention are generally prepared by utilizing equimolar proportions of the silazanes and the carbocyclic diols in the polymerization reactions. However, the polymerization reactions may successfully be carried out when the molar ratio of the silazanes is greater than the molar ratio of the carbocyclic diols and when the molar ratio of the silazanes is less than molar ratio of the carbocyclic diols so long as the moles of silazanes times the number of reactive nitrogen atoms in the silazanes is greater than the moles of carbocyclic diols. Successful polymerizations have been accomplished with a molar ratio of silazane to carbocyclic diol of between 1:2 and 2:1 and at moderate temperature of 110 to 120°C.

The polymerizations can be carried out with or without a solvent. When a solvent is used, it is generally toluene although other solvents are satisfactory i.e. xylene, pyridine, or perchlorethylene.

Dimeric, trimeric, or tetrameric cyclic or linear silazanes react with carbocyclic compounds containing two hydroxyl groups separated by at least three carbon atoms to yield linear high molecular weight polymers. By virtue of their chemical structure and high molecular weight, the polymers have improved properties and are suitable for use in elastomer compositions.

Cyclic silazanes are incorporated as a linear segment of the ring through a ring opening reactor with the diol in which one molecule of ammonia or amine is lost per molecule of diol employed in the reaction. The average structure of the polymer becomes:

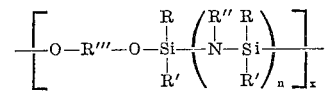

$n = 1$, 2, or 3
R'''= carbocyclic compound

Linear silazanes are incorporated by the loss of terminal amino groups of dimers or trimers with two molecules of ammonia or amine being formed for each molecule of diol employed in the reaction. When a dimer is employed in the reaction, the average structure of the polymer may be represented by the formula,

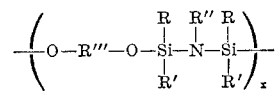

R'''= the carbocyclic compound

As previously indicated, the silanes initially employed in producing silazanes of the invention have predominantly the

system and the silazanes obtained are essentially cyclic or chain monomers, recognized as individual compounds even though they are dimer, trimer, tetramer, etc. silazanes.

Diols of value in this invention are those containing a carbocyclic ring structure in which the two hydroxy groups are separated by at least three carbon atoms of the ring. The hydroxy groups may be attached to an aliphatic side chain so long as three ring carbon atoms intervene between points of attachment of the side chains to the ring. Likewise the hydroxy groups may be attached to linked or fused carbocyclic rings, but their point of attachment must be separated by at least three carbon atoms of one of the rings. The following are examples of diols that have been successfully employed in the invention: Resorcinol, 4,4'-biphenol, hydroquinone, 4,4'-oxydiphenol, 1,4 - benzenedimethanol, 1,4 - cyclohexanedimethanol, bisphenol "A" (p,p'-isopropylidene bisphenol).

In a procedure that was frequently employed, 0.2 mole of the silazane and 0.2 mole of the diol in 10 ml. of toluene were heated at reflux (115° C.) for 24 hr. The ammonia or amine evolved during the reaction was allowed to distill from the reaction flask, collected in an acid trap, and titrated to determine the extent of the reaction. The polymerizations were usually allowed to proceed 24 hr., although satisfactory polymers could be obtained after shorter polymerization periods. The rate of amine or ammonia evolution, which was initially rapid, became slower as the molecular weight of the polymer increased. At the conclusion of the heating period, the polymer was devolatilized at reduced pressure up to 100° C. In most experiments, polymer yields were near quantitative.

The molecular weight of the polymer is assessed in terms of intrinsic viscosities in toluene. Techniques of determining this property and its correlation with molecular weight are well known (P. W. Allen, Techniques of Polymer Characterization, Academic Press, New York, 1959). A polymer with an intrinsic viscosity of 1.22 in toluene was shown to have a weight average molecular weight of about 130,000 by light scattering techniques.

In several of the following examples a small amount of a vinylsilazane is included in the monomer compositions. In this manner, a small percentage of vinyl groups are introduced along the polymer chain to provide cross-linking sites for curing the polymers.

As further illustrating the invention, but without intending to thereby limit the same, the following examples are presented.

Example I

A mixture of 8.59 g. (0.04 mole) of hexamethylcyclotrisilazane, 9.12 g. (0.04 mole) of bisphenol "A," 0.2 g. (0.0008 mole) trimethyltrivinylcyclotrisilazane, and 10 ml. of toluene was heated to the reflux temperature of the mixture over a period of 1 hr. At about 70° C., the mixture became homogeneous and ammonia was evolved rapidly. After 3 hr. an additional 10 ml. of toluene was added to reduce the viscosity of the mixture. Heating was continued at 120–130° C. for a total of 24 hr. After the sample was cooled, the solvent was removed under reduced pressure, first at 60° C. and finally at 130° C. to obtain 17.6 g. (quantitative yield) of a colorless rubbery gum. The intrinsic viscosity of the polymer in toluene was 1.60 g./deciliter. The experimentally determined elemental content of the polymer was found to be: Carbon, 58.77%; hydrogen, 7.72%; nitrogen, 6.35%; and silicon, 19.36%. The values agreed will with the values calculated for the average elemental content for a polymer structure incorporating one cyclosilazane unit per diol unit: Carbon, 58.55; hydrogen, 7.96; nitrogen, 6.50; silicon, 19.56.

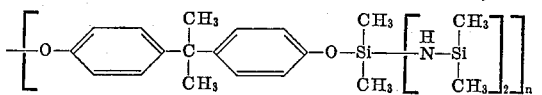

Example II

When 10.9 g. (0.05 mole) of hexamethylcyclotrisilazane, 5.5 g. (0.05 mole) of resorcinol, and 20 ml. of toluene were polymerized in the manner described in Example I, the resulting polymer was a tacky gum with an intrinsic viscosity in toluene of 0.89. The experimentally determined values for elemental content were: Carbon, 46.02; hydrogen, 7.72; nitrogen, 8.69; and silicon, 26.87. The calculated values for the proposed polymer structure are: Carbon, 46.10; hydrogen, 7.72; nitrogen, 8.96; and silicon, 26.96.

Example III

In a polymer preparation similar to Example I, 4.38 g. (0.02 mole) of hexamethylcyclotrisilazane and 2.76 g. (0.02 mole) of 1,4-benzenedimethanol gave a polymer with an intrinsic viscosity of 0.45. The elemental content found for this polymer was: Carbon, 49.62%; hydrogen, 8.22%; nitrogen, 7.83%; and silicon, 24.22%. The calculated values are: Carbon, 49.36; hydrogen, 8.28; nitrogen, 8.23; and silicon, 24.74.

The following illustrates other organic diols that have been used in the polymerization reaction and also shows solvents other than toluene that can be employed. In the following experiments, equimolar quantities of hexamethylcyclotrisilazane and the organic diol were employed.

| Examples | Diol | Solvent | Intrinsic Viscosity |
|---|---|---|---|
| IV | Hydroquinone | Toluene | 0.33 |
| V | 4,4'-oxydiphenol | do | 0.55 |
| VI | 4,4'-biphenol | do | 0.72 |
| VII | 1,4-cyclohexanedimethanol | do | 0.79 |
| VIII | Resorcinol | Pyridine | 0.45 |
| IX | 4,4'-bis(hydroxymethyl)-diphenyl ether | Xylene | ¹ 0.61 |

¹ Polymerization temperature was 160° C.

The following is an example of a polymerization carried out in the absence of solvent.

Example X

Equimolar quantities of bisphenol "A" and hexamethylcyclotrisilazane were mixed and heated in a test tube placed in an oil bath at 55° C. for 15 min. Subsequently the temperature of the bath was raised to 250° C. over a 30 min. period and maintained at that temperature for 30 min. The resulting polymer was a hard, elastic gum with an intrinsic viscosity of 1.25.

The following is an example of a polymer that has been cured to a rubber.

Example XI

The procedure in Example I was employed in the preparation of a polymer from 32.2 g. (0.147 mole) of hexamethylcyclotrisilazane, 0.76 g. (0.003 mole) of trimethyltrivinylcyclotrisilazane, and 34.2 g. (0.15 mole) of bisphenol "A." A total of 175 ml. of toluene was employed as the polymerization solvent. The polymer, which was a rubbery gum, was obtained in a 99% yield and had an intrinsic viscosity of 1.22.

When 100 parts of the polymer was milled with 20 parts of silicon dioxide by conventional techniques and irradiated with 5 megarads gamma radiation from a $Co^{60}$ source, a rubber was obtained with the following properties: Tensile strength, 290 lb./sq. in.; elongation, 350%; hardness, Shore A, 38. The tensile strength was increased to 430 lb./sq. in. when 10 megarads of gamma radiation was employed. The gum was also cured with 0.5 parts of tert-butyl perbenzoate to give a rubber with a tensile strength of 235 lb./sq. in. and an elongation of 175%.

The following examples illustrate that cyclic trimers cannot be prepared by the aminolysis of diorganodichlorosilanes.

Example XII

When 129 g. (1.0 mole) of dichlorodimethylsilane dissolved in 1.5 liters of Skellysolve "F" was treated with an excess of methylamine at 5° C., and the product was filtered and fractionally distilled, 71.5 g. (60.6% yield) of dimethylbis(methylamino)silane was collected at 107–9° C. and 17.7 g. (17.3% yield) of 1,3-bis(methylamino) pentamethyldisilazane was obtained at 89–92° C. at 20 mm. No higher boiling components of the reaction product could be isolated.

Example XIII

When a solution containing 64.5 g. of dichlorodimethylsilane in 200 ml. of ether was treated with a solution of 186 g. aniline in 300 ml. of ether, and product was refluxed 1 hr., cooled and filtered, fractional distillation gave 86.5 g. (71.5% yield) of dianilinodimethylsilane boiling at 166–70° C. at 3 mm. The compound melted at 57° C. No significant quantities of other products were isolated in the reaction.

Example XIV

Excess methylamine was added to a solution of 126.5 g. (0.5 mole) of dichlorodiphenylsilane dissolved in 1.5 liters of Skellysolve "B" while the mixture was first maintained near 25° C. then heated to 65° C. The addition of the amine was discontinued and heating was continued for 2 hr. When the product was filtered and distilled, 100.9 g. (83.5% yield) of bis(methylamino) diphenylsilane was obtained. This compound boiled at 108–112° C. at 0.13 mm., and no higher boiling products were obtained from the reaction.

Although silylamine monomers, which have the general formula $R_2Si(NHR')_2$, are not useful in preparing polymers containing silazane linkages, the dimer, 1,3-bis(methylamino)pentamethyldisilazane can be employed in the polymerization reaction. An example follows:

Example XV

A mixture of 15.6 g. (0.076 mole) of 1,3-bis(methylamino)pentamethyldisilazane, 0.18 g. (0.0008 mole) of 1,3-bis(methylamino)-1,3-divinyltrimethyltrisilazane, and 17.5 g. (0.077 mole) of bisphenol "A" were polymerized in toluene in the manner described in Example I except that a polymerization time of 5 hr. was employed. The polymer, which was an elastic gum with an intrinsic viscosity in toluene of 0.20, was obtained in a 99.8% yield. When a sample of the polymer was mixed with a small amount of di-tert-butyl peroxide and heated in an oven at 130° C. overnight a tough, transparent rubber was obtained.

Following are several examples that illustrate the preparation of cyclic silazane trimers that are useful in polymer preparation.

Example XVI

A mixture of 71.5 g. (0.60 mole) of dimethylbis(methylamino)silane and 0.7 g. of ammonium sulfate was heated from 87° C. to 155° C. in 2 hr. and subsequently maintained at 155° C. for 3 hr. Methylamine was evolved continuously during the reaction. Fractional distillation gave 48.3 g. (92.7% yield) of nonamethylcyclotrisilazane, which boiled at 91–4° C. at 9 mm. The melting point of the product was 33–4° C.

Example XVII

When 17.0 g. (0.14 mole) of bis(methylamino)methylvinylsilane and 0.18 g. of ammonium sulfate was heated to 180° C. over a period of 1.5 hr., and the product was distilled, a 77% yield of hexamethyl-2,4,6-trivinylcyclotrisilazane, which boiled at 110–13° C. at 4 mm. was obtained.

Example XVIII

A mixture of 85.0 g. (0.35 mole) of dianilinodimethylsilane and 0.9 g. of ammonium sulfate was heated to 200° C. over a period of 2 hr. and the heating was continued at 200° C. for additional hour. The heating was carried out at a pressure of 10 mm., and aniline, which boiled at 65° C. at that pressure, was allowed to distill out of the reaction flask. When the product was cooled and treated with 100 ml. of Skellysolve "B," 12.9 g. (24.8% yield) of hexamethyl - 1,3,5 - triphenylcyclotrisilazane was precipitated. The product melted at 250–52° C.

Example XIX

A 48.4 g (0.2 mole) sample of diphenylbis(methylamino)silane and 0.5 g. of ammonium sulfate were heated to 200° C. over a 6 hr. period and finally at 200° until no more methylamine was evolved. Hexaphenylcyclo-1,3,5-trimethyltrisilazane, which crystallized on cooling, was recrystallized to yield 22.1 g (52% yield) of the cyclosilazane which had a melting point of 219–21° C.

Example XX

Hexamethyl - 1,3,5 - tribenzylcyclotrisilazane was obtained by a procedure similar to Example XVI. The compound melted at 57–60° C.

The following example demonstrates that the specially prepared cyclic trimers can be employed in polymerization reactions with organic diols, to obtain polymers with improved properties.

Example XXI

A mixture of 2.63 g. (0.010 mole) of nonamethylcyclotrisilazane and 2.35 g. (0.010 mole) of bisphenol "A" was polymerized in the manner described in Example I using toluene as a solvent. The resulting polymer had an intrinsic viscosity of 1.85 in toluene. A toluene solution of the polymer could be cast into a film and air-dried.

The hydrolytic stability of this polymer was determined by the following procedure: A solution of about 0.1 g. of the polymer dissolved in 10 ml. of toluene was heated at 65° C. and treated with 20 ml. of a 2.5% solution of water in methanol. While the mixture was maintained at 65° C., the rate of amine evolution was employed to determine the rate of hydrolysis of the polymer.

Under these conditions, the polymer from bisphenol "A" and nonamethylcyclotrisilazane was 1.45% hydrolyzed after 2 hr. Polymers derived from hexamethylcyclotrisilazane hydrolyzed much more rapidly. The polymer of Example I containing bisphenol "A" was hydrolyzed to the extent of 34.6%; the polymer of Example II with resorcinol was 50.0% hydrolyzed; the polymer of Example V with 4,4'-oxydiphenol was 58.0% hydrolyzed; and the polymer of Example VI with 4,4'-biphenol was 47.5% hydrolyzed.

The polymer also exhibited excellent thermal stability. When it was heated at the rate of 3° per min. under nitrogen in an Aminco thermogravimetric balance, the polymer retained 95% of its weight at 400° C.

Example XXII

A polymer was obtained by the procedure of Example I from 5.22 g. (0.02 mole) of nonamethylcyclotrisilazane and 2.2 g. (0.02 mole) of resorcinol. Pyridine was employed as the solvent, and a polymer with an intrinsic viscosity of 0.39 in toluene was obtained in a quantitive yield. Under the conditions of hydrolysis described in Example XXI, this polymer was 7.0% hydrolyzed after 2 hr.

Example XXIII

A polymer from 2.61 g. (0.01 mole) of nonamethylcyclotrisilazane and 2.28 g. (0.01 mole) of bisphenol "A" prepared by the procedure of Example 1 but with perchloroethylene as a solvent had an intrinsic viscosity in toluene of 0.25. The polymer could be drawn into a fiber.

Example XXIV

When 5.8 g. (0.02 mole) of 1-trimethylsilylhexamethylcyclotrisilazane (prepared by the method described by Breed and Elliott, Inorganic Chemistry, 2, 1064 (1963)) and 4.6 g. (0.02 mole) of bisphenol "A" were heated under conditions of Example I, a polymer was obtained as a tacky gum with an intrinsic viscosity in toluene of 0.09. This polymer was hydrolyzed to the extent of 30.0% under the conditions described in Example XXI.

Example XXV

A viscous liquid polymer with an intrinsic viscosity of 0.03 was obtained by the method of Example I from 3.63 g. (0.01 mole) of 1,3-bistrimethylsilylhexamethylcyclotrisilazane (prepared by the method described by Fink, Helv. Chim. Acta, 45, 1081 (1962)), and 2.28 g. (0.01 mole) of bisphenol "A." This polymer was hydrolyzed to the extent of 12.4% after 2 hr. under the conditions of Example XXI.

The following example shows that a catalyst can be used in the polymerization reaction and illustrates the use of a linear trisilazane trimer that can be used in the polymerization reaction.

Example XXVI

A polymer was prepared by the method of Example I from 2.9 g. (0.01 mole) of 2,2-dimethyl-1,3-bis(dimethyl(methylamino)silyl) - 1,3 - diaza - 2-silacyclopentane (prepared by the method described by Breed, Elliott, and Ferris J. Org. Chem., 27, 1114 (1962) and 2.3 g. (0.01 mole) bisphenol "A." Ammonium sulfate, 0.3 g., was added to the mixture as a catalyst. The resulting polymer had an intrinsic viscosity of 0.66.

The following are specific examples in which 2:1 and 1:2 mole ratios of silazane to diol were employed.

Example XXVII

A mixture of 5.47 g. (0.025 mole) of hexamethylcyclotrisilazane and 11.4 g. (0.05 mole) of bisphenol "A" was polymerized in the manner described in Example I using toluene as solvent. The evolution of ammonia (collected in an acid trap) was 97.4 percent of theory based on two moles of diol reacting with one mole of silazane. The resulting polymer had an intrinsic viscosity of 1.35 in toluene. Under the conditions of hydrolysis described in Example XXI, this polymer was 36.6 percent hydrolyzed after 2 hrs. The polymer was determined to have a structure incorporating one Si—N—Si unit per diol unit.

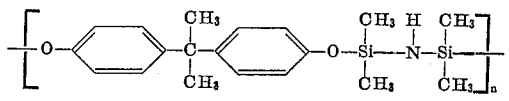

Example XXVIII

A polymer from 10.95 g. (0.05) mole of hexamethylcyclotrisilazane and 5.7 g. (0.025 mole) of bisphenol "A" prepared by the procedure of Example I had an intrinsic viscosity in toluene of 1.20. This polymer was hydrolyzed to the extent of 59.0 percent under the conditions described in Example XXI.

The present invention enables the formation of new high molecular weight resinous silazane materials. The above examples are not intended to limit the scope of the present invention but are intended as only certain exemplary embodiments thereof, and it is understood that the scope of the present invention is to be limited only by the scope of the hereunto appended claims.

We claim as our invention:

1. A silazane polymer resin consisting essentially of repeating units having the general formula

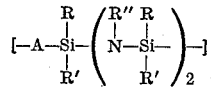

wherein R, R', and R" are monovalent alkyl or aryl groups, and wherein A is a divalent radical of a carbocyclic diol, said radical having two —O— groups separated by at least three carbon atoms of the carbocyclic ring, each of said —O— groups being directly linked to a silicon atom.

2. A silazane polymer resin according to claim 1, wherein A is p,p'-isopropylidene bisphenoxy.

3. A silazane polymer resin according to claim 1, wherein A is benzene-1,3-dioxy.

4. A silazane polymer resin according to claim 1, wherein R, R', and R" are alkyl.

5. A silazane polymer resin according to claim 1, wherein R, R', and R" are methyl.

6. A silazane polymer resin according to claim 5, wherein A is p,p'-isopropylidene bisphenoxy.

7. A fiber of a silazane polymer resin according to claim 6.

8. A silazane polymer resin according to claim 5, wherein A is benzene-1,3-dioxy.

9. A coating composition comprising a silazane polymer resin according to claim 1 in toluene.

10. A coating composition comprising a silazane polymer resin according to claim 6 in toluene.

References Cited

UNITED STATES PATENTS 3,043,798   7/1962   Boyer et al. _____ 260—46.5

OTHER REFERENCES

Morgunova et al., Plasticheskie Massy 1963, No. 3, 26–7.

Wannagat et al.. Monatsh Chem., 96, 1895–1901 (1965), abstract in C.A. 64, 1965–7 (1966).

WILLIAM H. SHORT, *Primary Examiner.*

M. GOLDSTEIN, *Assistant Examiner.*